United States Patent [19]

Kishi et al.

[11] Patent Number: 4,627,003
[45] Date of Patent: Dec. 2, 1986

[54] METHOD AND APPARATUS FOR CREATING NUMERICAL CONTROL DATA

[75] Inventors: Hajimu Kishi, Hino; Masaki Seki, Takaidonishi; Kunio Tanaka, Hachioji, all of Japan

[73] Assignee: Fanuc Ltd, Minamitsuru, Japan

[21] Appl. No.: 470,483

[22] Filed: Feb. 28, 1983

[30] Foreign Application Priority Data

Feb. 27, 1982 [JP] Japan ................... 57-031615

[51] Int. Cl.⁴ .................................. G06F 15/46
[52] U.S. Cl. .................................. 364/520; 364/171; 364/191
[58] Field of Search ............ 364/520, 515, 475, 474, 364/191–193, 171, 471; 178/18

[56] References Cited

U.S. PATENT DOCUMENTS

| | | | |
|---|---|---|---|
| 3,391,392 | 7/1968 | Doyle | 364/520 |
| 3,720,948 | 3/1973 | Eichen et al. | 444/1 |
| 3,878,983 | 4/1975 | Hamill, III et al. | 364/171 |
| 4,033,206 | 7/1977 | Morita et al. | 364/171 |
| 4,042,866 | 8/1977 | Morita et al. | 318/568 |
| 4,074,349 | 2/1978 | Ueda | 364/171 |
| 4,296,473 | 10/1981 | Imazeki et al. | 364/520 |
| 4,308,585 | 12/1981 | Jordan | 364/520 |
| 4,370,720 | 1/1983 | Hyatt | 364/171 |
| 4,381,512 | 4/1983 | Buttler | 364/520 |
| 4,402,051 | 8/1983 | Nozawa et al. | 364/520 |
| 4,456,960 | 6/1984 | Wakai | 364/474 |
| 4,456,962 | 6/1984 | Imazeki et al. | 364/520 |
| 4,479,032 | 10/1984 | Parnell | 364/520 |
| 4,521,845 | 6/1985 | Schwefel | 364/171 |

FOREIGN PATENT DOCUMENTS 1173396 12/1969 United Kingdom .
1233135  5/1971 United Kingdom .
2042726  9/1980 United Kingdom .

OTHER PUBLICATIONS

European Search Report, completed 8/17/83, by Examiner Becker at The Hague.

Primary Examiner—Errol A. Krass
Attorney, Agent, or Firm—Staas & Halsey

[57] ABSTRACT

A method and apparatus for creating numerical control data by entering coordinates which specify points on a drawing placed on a tablet. A minimum reading distance is preset at the time that coordinate values of points are to be entered from the tablet. This is followed by entering the coordinate values of prescribed points on the drawing by designating the points at random using a coordinate designating device. The coordinate values of the designated point are generated each time the coordinate designating device travels a distance equivalent to the minimum reading distance, or sampling pitch, as the device is moved continuously along a graphic appearing on the drawing. Then, numerical control data is created by using the generated coordinate values. Numerical control data approximating straight line segments can be readily created, even for curves other than straight lines and circular arcs, by setting the sampling pitch interval to a suitable value.

2 Claims, 22 Drawing Figures

```
       FAPT
     DIGITIZER
        Press
        R-Key
   R0: Start Key
   R1: Set Key
   R2: Display Key
   R3: Request Key
```

Fig. 6

```
    ⎧ Select and key in
    ⎨ desired number from
    ⎩ following Items.
NO.    Item              Present Parameter
01  Rapid-Traverse      : RAPID
    Display Item        : NC, ABS, C
02  Print Item          : NC, ABS, C
03  Display Item        :
04  Graphic Display     :
05  Tablet Menu Setting :
06  Scale               : 1.0
07  NC Tape Code        : EIA
08  End of Settings
```

METHOD AND APPARATUS FOR CREATING NUMERICAL CONTROL DATA

CROSS REFERENCE TO RELATED APPLICATIONS

This application is related to the following applications, all of which are assigned to the assignee of the subject application: U.S. application Ser. No. 470,453, filed Feb. 28, 1983 and now abandoned; U.S. application Ser. No. 469,824, filed Feb. 25, 1983 now U.S. Pat. No. 4,555,590; U.S. application Ser. No. 469,814, filed Feb. 25, 1983 and now abandoned; U.S. application Ser. No. 469,825, filed Feb. 25, 1983 and now abandoned; U.S. application Ser. No. 470,484, filed Feb. 28, 1983 and now abandoned; and U.S. application Ser. No. 470,482, filed Feb. 28, 1983.

BACKGROUND OF THE INVENTION

This invention relates to a system for creating numerical control data and, more particularly, to a method and apparatus capable of creating numerical control data while a coordinate designating device is moved continuously along a graphic drawn on a design drawing.

A numerically controlled machine tool (hereafter referred to as an NC machine tool) is operated in a manner specified by a machining program stored on an NC tape to subject a workpiece to prescribed machining. To create an NC tape for a cutting operation, numerical control information and other machining conditions are punched into a paper tape in accordance with predetermined rules. The numerical control information includes all the data necessary for machining, such as numerical values obtained from a design drawing and relating to the dimensions of the workpiece that is to be machined, feed speed, and the like. When machining the workpiece by means of an NC machine tool, the NC tape which has been prepared, is fed into the tape reader of a numerical control device so that the various instructions recorded on the NC tape may be read successively. The numerical control device responds by executing the read instructions to cause the machine tool to machine the workpiece as prescribed. Since considerable time and experience is required to create the information stored on an NC tape, it has been necessary to employ a highly trained person for such tasks. In order to allow less experienced individuals to perform these tasks, an apparatus for automatically preparing an NC tape has recently been developed and put into practical use. The apparatus includes a graphic display, keyboard and printer, and is extremely useful in preparing NC tapes in a simple, accurate and rapid manner. Consisting of a microcomputer, the apparatus for automatic preparation of an NC tape has an internal main memory for storing the NC tape preparation software, or system program.

To create a machining program by means of the above-described apparatus, the prescribed system program is loaded into the main memory, and a so-called "part program" consisting of a group of data specifying the contour of a part, namely the path of a tool for cutting the contour, must be created and entered in accordance with predetermined rules. If the machining to be performed is, for example, a milling operation, the group of data constituting the part program will comprise (a) graphic data indicative of the shape of a part (consisting of tool diameter data, part surface data specifying the axis along which the tool is to be transported, drive surface data specifying motion in the direction of tool diameter when the tool is transported, and stop surface data specifying how far the tool may be moved when the tool is transported along both the part surface and drive surface), and (b) command data for tool motion (consisting of positioning data for positioning the tool at a point where motion on the contour of a part is to start, and data commanding motion along the contour). When the part program has been entered into the apparatus for automatic NC tape preparation, the latter creates the machining program automatically under the control of the system program, stores the machining program in the main memory, and then prepares an NC tape by punching the information into a paper tape.

Thus, with the apparatus for automatic NC tape preparation, a desired NC tape can be prepared merely by entering the part program. The advantage of the apparatus is that even an NC tape containing a program for a highly sophisticated shape can be prepared in a short period of time in a simple and accurate manner.

While the above-described apparatus facilitates the preparation of an NC tape, it is still necessary for a programmer to create the part program at his desk from a design drawing while abiding by predetermined rules. The creation of a part program in such fashion is both a troublesome and time-consuming task and can only be accomplished by a programmer having considerable programming skill. In addition, though the apparatus can create an NC tape for a sophisticated shape in an accurate manner, certain types of NC machining operations for the fabrication of gloves, leather shoes, wood crafts and the like do not require that much precision. It would be convenient if an NC tape for such machining operations could be created in a simple and rapid manner by an individual not possessing special programming skill.

SUMMARY OF THE INVENTION

Accordingly, an object of the present invention is to provide a method and apparatus for creating NC data in a simple and rapid manner without requiring special skills.

Another object of the present invention is to provide a method and apparatus for creating NC data, which is well-suited to the creation of data that does not require a high level of precision.

Still another object of the present invention is to provide a method and apparatus for creating NC data based on dimensional and positional data which can be entered merely by designating desired points on a design drawing, even if dimensions and the like are not written out on the drawing.

A further object of the present invention is to provide a method and apparatus for creating NC data through which the coordinates of points on a graphic can be entered by designating the points at random using a coordinate designating device, through which the graphic can be entered by moving the coordinate designating device therealong, and through which NC data can be created based on the entered data.

These and other objects of the invention are attained by providing a method and apparatus for creating numerical control data by entering coordinates which specify points on a drawing placed on a tablet. A minimum reading distance is preset at the time that coordinate values of points are to be entered from the tablet.

This is followed by entering coordinate values of points on the drawing by designating the points at random by coordinate designating means; generating the coordinate values of whatever point is being designated by the coordinate designating means each time the means travels a distance equivalent to the minimum reading distance as the means is moved continuously along a graphic appearing on the drawing; and creating numerical control data by using the coordinate values. Thus it is possible to not only enter the coordinates of points located on a drawing by designating the points at random, but also to enter the coordinates of a multiplicity of points by moving a coordinate designating device along a graphic drawn on the drawing. Numerical control data approximating straight line segments can be readily created, even for curves other than straight lines and circular arcs, by setting a sampling pitch interval to a suitable value.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
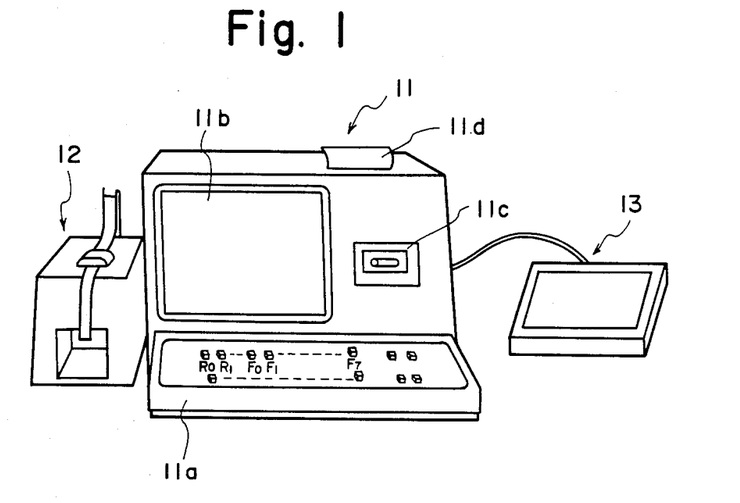
FIG. 1 is a perspective view of the general features of a system for creating numerical data according to the present invention.

Reference will now be had to FIG. 1 which is a perspective view of the general features of a system for creating numerical control (NC) data according to the present invention. The system includes the main body 11 of an apparatus for creating NC data. The main body 11 comprises a keyboard 11a having a multiplicity of keys, a graphic display device 11b, a magnetic tape unit 11c for loading a magnetic tape cassette, a printer 11d, and a control unit, not shown. The control unit is constituted by a microcomputer which executes processing for the input and output of information, for digitizing and for the creation of NC data, all executed by means of a tablet as described hereinbelow, based on a system program stored previously in memory means such as a ROM (read-only memory). The multiplicity of keys provided on the keyboard 11a are for responding to prompts which appear on the system CRT, for designating system program loading, and for entering NC data. The graphic display device 11b displays, in graphical form, coordinate values obtained by digitization of positions designated by the tablet, as well as input data, numerical values, NC data and various messages or prompts for conversational interaction with the operator. The magnetic tape unit 11c is used to enter a system program into the main body of the NC data creating apparatus 11. By way of example, when using a tablet to enter coordinate values directly from a drawing and to prepare NC data, the software (system program) for digitizing processing must be fed into the main body 11. This is done by selecting the magnetic tape cassette containing the digitizing program, and loading the cassette into the magnetic tape unit 11c. To read the tape into the system, the operator need only touch a load button on the keyboard 11a after the cassette has been set in the tape unit 11c. The printer 11d is adapted to print out characters which appear on the screen of the graphic display device 11b, data punched in a paper tape, described later, and information which has been written into the loaded magnetic tape.

The system also includes a paper tape reader/-puncher 12 for preparing an NC tape by punching a paper tape with perforations indicative of the NC data prepared by main body 11, and for reading NC or other data which has already been punched into an NC tape. The system tablet, designated at 13, comprises a board which uses the principle of electromagnetic induction to enter data. By relying upon a coordinate designating device, such as a cursor unit or stylus pen, as means for designating coordinates, the tablet 13 is operable to input positional coordinates from a drawing laid on the tablet surface, these coordinates being fed into the main body 11 as an input thereto.

Figure 2:
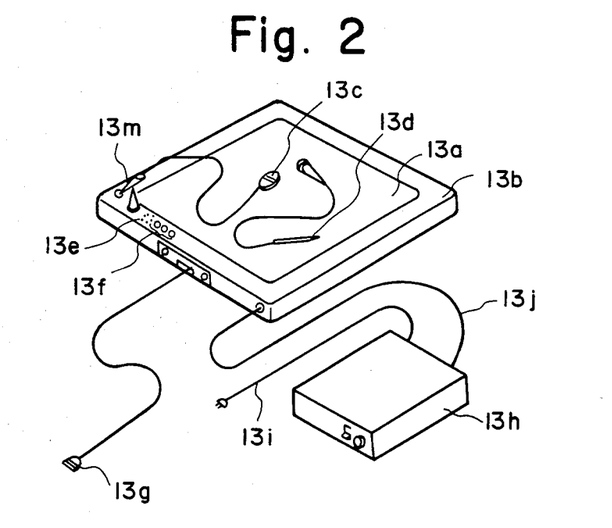
FIG. 2 is a schematic view of the external appearance of a tablet input device included in the system of FIG. 1.

The perspective view of FIG. 2 shows the external appearance of the tablet 13 in greater detail. The tablet 13 comprises a tablet main body or board 13a, a tablet cover 13b, a cursor unit 13c serving as the coordinate designating device, a stylus pen 13d, a buzzer 13e, a group of lamps 13f indicating, e.g., coordinate input mode and introduction of power, an input/output connector for connecting the tablet 13 to the main body 11, a power unit 13h for supplying the tablet body 13a with D.C. power, an A.C. cable 13i for connecting the power unit 13h to an A.C. source, a D.C. cable 13j for the connection between the tablet body and power unit, and a pen stand 13m for holding the stylus pen 13 when not in use. The cursor unit 13c or stylus pen 13d is used to enter coordinate and other data.

Figures 3, 4:
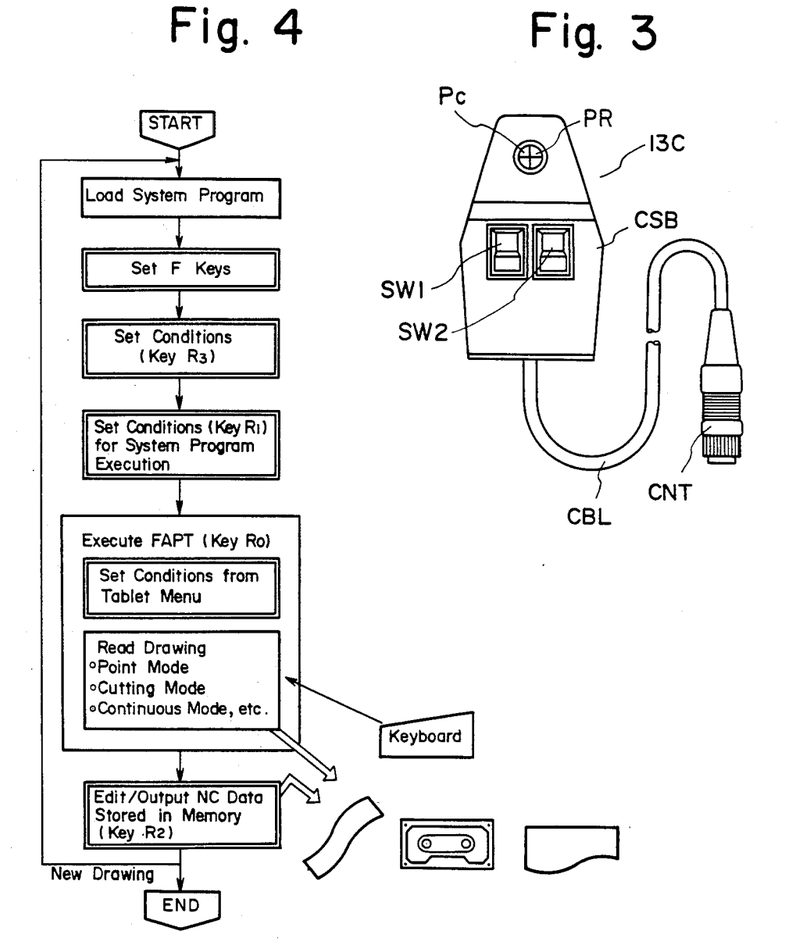
FIG. 3 is an enlarged, top view of a cursor unit 13C included in the system of FIG. 1.
FIG. 4 is a flowchart for describing, in general terms, the creation of numerical control data in accordance with the present invention.

The details of the cursor unit 13c are illustrated in the enlarged view of FIG. 3, which is a top view of the cursor unit. The cursor unit 13c has a main body CSB, first and second switches SW1, SW2, a position reader PR having a cross-hair arrangement, a connector CBL and a cable CNT leading from the connector CNT to the main body CSB. To enter the coordinates of a point, the intersection Pc of the cross hairs provided on the position reader PR, is aligned with the desired point on a drawing laid on the tablet body, followed by depressing the first switch SW1 or second switch SW2.

A flowchart for describing how NC data is created in accordance with the present invention is depicted in FIG. 4. The procedure may be broadly classified into operations of preprocessing, data input, NC data editing and data output. Reference will now be had to FIG. 4 to describe the general features of NC data creation and output.

(1) System loading step

Figure 5:
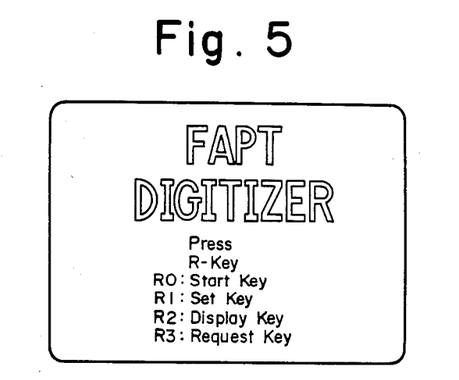
FIGS. 5 and 6 are plan views of examples of displays presented on the CRT of a graphic display device included in the system of FIG. 1.

First, following the introduction of power, the operator sets the magnetic tape cassette containing the prescribed software (system program) in the magnetic tape unit 11c (FIG. 1) and touches the load button on the keyboard 11a to store the system program in a main memory incorporated within main body 11 of the system. This causes the title (e.g. FAPT DIGITIZER) of the system program, as well as a prompt calling for pressing of an R-key, to appear on the screen of the graphic display device 11b, as shown in FIG. 5.

(2) F-Key setting step

The keyboard 11a includes an array of eight F-keys ($F_0$ to $F_7$) which remain locked in the on state when depressed. The operator, by setting tne desired F-keys in the on (depressed) or off state, selects the operating mode of the tablet 13 as well as the output device to be used. Table I, below, gives the function and meaning of each F-key, as well as the associated subject matter. It should be noted that the F-keys can be set prior to the system loading step if desired.

(3) Step for setting initial conditions

After setting the F-keys, the operator sets the conditions for the preparation of an NC tape. Specifically, four ($R_0$ to $R_3$) of the above-mentioned R-keys are provided on the keyboard 11a. First, the operator depresses the $R_3$ key, causing the prompt "REQUEST=" to appear at the lower left side of the CRT screen. The operator responds to the prompt by setting and entering conditions in accordance with predetermined rules, and then depresses an NL key, located on the keyboard 11a, two consecutive times. This restores the CRT screen to the display depicted in FIG. 5 and ends the condition setting processing.

TABLE I

| Key Symbol | Function | Subject | Meaning |
| --- | --- | --- | --- |
| $F_0$ | Input | Test Mode | To constantly display coordinate values sensed by tablet |
| $F_1$ | " | Input Data Confirmation Mode | To confirm coordinate values sensed by tablet, and to change coordinate values when required |
| $F_2$ | Output | Output Mode | When F2 is ON, to establish step feed during NC data |

TABLE I-continued

| Key Symbol | Function | Subject | Meaning |
| --- | --- | --- | --- |
| | | | output and enable both insertion and deletion of data |
| $F_3$ | " | CRT Characters | To display list of, e.g., NC data, on CRT |
| $F_4$ | " | CRT Graphics | To display graphically, on CRT, coordinate values entered by tablet |
| $F_5$ | " | Printer | To print out, via printer, list of results of FAPT execution |
| $F_6$ | " | Paper Tape | To punch NC command data into paper tape |
| $F_7$ | " | MT Cassette | To write NC command data into magnetic tape cassette |

The conditions which can be set are, e.g., machine tool parameters, input/output units (English or metric system, etc.) and special codes. The machine tool parameters may include the name of each axis of movement (X, Y, Z . . . ), the minimum unit set for each axis of movement, and G-function instruction codes (indicating quick feed, linear cutting feed, clockwise and counter-clockwise circular interpolation, absolute command and incremental commands, etc.).

(4) Step for setting execution conditions

Figure 6:
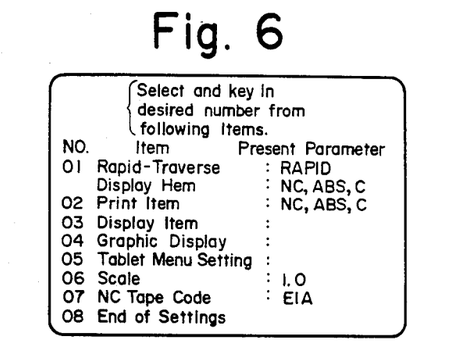

Next, the operator depresses the $R_1$ key to set various conditions for system program execution. The information (shown in FIG. 6) will appear on the CRT screen of the graphic display device 11b when the $R_1$ key is depressed. Now, in accordance with the conditions which are desired to be set, the operator may select one of the eight items numbered 01 to 08 shown in FIG. 6. When one of the item numbers is keyed in, a prompt appears on the display screen for each of various conditions to be set with regard to the entered item number. When the operator has successively entered the set conditions in response to the prompts, the entry of conditions with regard to the particular item number ends. The operator then depresses the NL key a number of times in succession to return the CRT screen to the display shown in FIG. 6, upon which he may set the conditions for a new item number. Table II shown below gives the meaning of each numbered item.

TABLE II

| No. | Item | Meaning |
| --- | --- | --- |
| 1. | Rapid-traverse Tool Path Display | To designate whether rapid-traverse motion should be displayed |
| 2. | Print Item | Item to be printed |
| 3. | Display Item | Item to be displayed on CRT |
| 4. | Graphic Display | Scale and position of graphic displayed on CRT |
| 5. | Tablet Menu position | To designate menu position on tablet |
| 6. | Scale | To designate scale and scale reduction ratio for read coordinate values |
| 7. | NC tape code | NC tape output code |
| 8. | End of settings | End of setting operation |

In Table II, Item No. 1 designates whether rapid-traverse motion, namely the path of a tool in the rapid-traverse mode, is to be displayed. Entering "RAPID" opposite this item number will cause the path to be displayed. Item Nos. 2 and 3 are for selecting print and display items, respectively. Prescribed outputs can be printed or displayed by entering the parameters shown in the left column of Table III, included hereinbelow. In order for an output to be capable of print out or display, it is necessary that either key $F_2$ or key $F_3$ of the eight F-keys be placed in the ON state.

Item No. 5 is provided for setting a menu position (information input zone) on the tablet. Since the tablet has the capability of identifying designated points, it can also be made to function as a switch if a portion of the tablet surface is partitioned into a plurality of areas and each area is assigned a specific meaning. For example, if a certain area is set to serve as an absolute command area, designating the area will cause the NC data creating apparatus to create NC data in the form of absolute values from then on.

TABLE III

| Parameter | Meaning |
| --- | --- |
| NC | To output content of created NC tape |
| ABS | To output absolute value for each axis |
| C | To output center and radius of circle during circular interpolation |
| PART | To output content of created part program |

To enter graphic data, a design drawing is laid on the tablet surface and the position of a predetermined point on the drawing is entered by designating the point. When a portion of the tablet surface (specifically an information input zone described below) which is to be made to function as a switch or data input key, is fixed in area or position, there will be occasions where the information input zone of the tablet surface is covered by the design drawing diagram because of the size of the design drawing or the type of design. In such a case, the tablet will not be able to discriminate whether a certain designated area on the tablet surface is a point on the design or an area which is to function as a switch or data input key. While there are also instances where the diagram itself will not overlay the information input zone on the tablet surface, inconveniences can still be encountered because this part of the tablet surface may be covered by a blank portion of the drawing.

In view of the foregoing problem, and according to the present invention, any area on the tablet surface can be made to serve as an information input zone through use of Item No. 5 mentioned above. This will now be described with reference to FIG. 7, which is used to explain how an information input zone is set, and with reference to FIG. 8 which includes schematic diagrams of menu configurations for designating the size of the information input zone, the boundaries of areas $a_1$ through $a_{16}$ constituting the zone, and the meaning of each area. A menu MN, printed on, e.g., white paper or wax paper, may have a horizontal configuration composed of 16 areas $a_1$ through $a_{16}$ in a two-row by eight-column array, as depicted in FIGS. 8(A) and 8(C), or a vertical configuration composed of 16 areas $a_1$ through $a_{16}$ in an eight-row by two-column array, as shown in FIG. 8(B). The size of an information input zone depends upon the size of the menu and can be set at will. The menu MN in FIG. 8(C), for example, takes up more space than the menu in FIG. 8(A). The numbers of rows and columns also can be set as desired.

Figure 7:
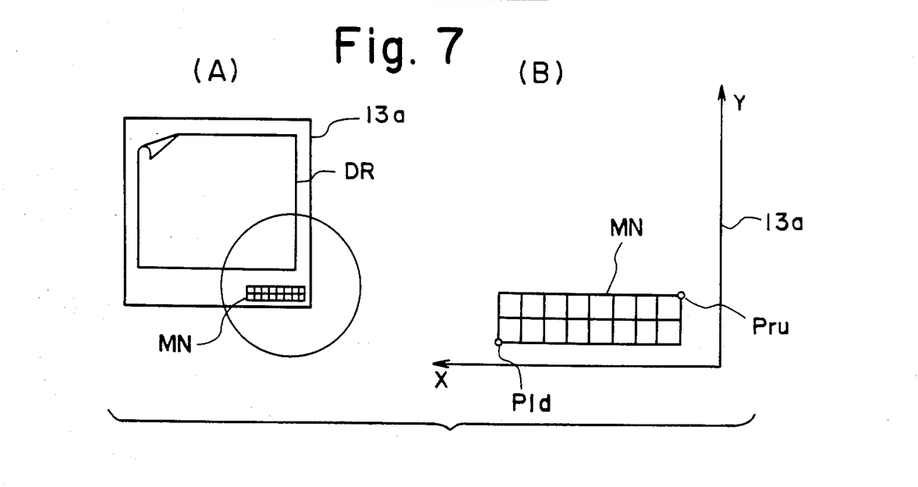
FIGS. 7(A) and 7(B) are plan views of a tablet and drawing used for describing an operation for setting an information input zone in accordance with the present invention.
Figure 8:
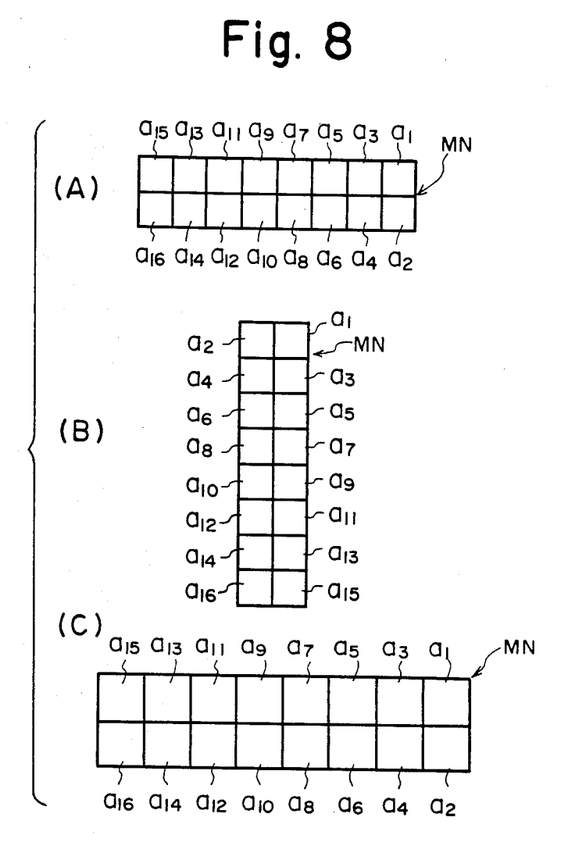
FIGS. 8(A) through 8(C) are schematic diagrams of menues for designating the size of an information input zone, as well as the boundaries of areas which constitute the information input zone, in accordance with the present invention.

An information input zone is set through the following sequence, described with reference to FIG. 7, in which FIG. 7(B) is an enlarged view of the portion enclosed by the circle in FIG. 7(A):

Initially, a drawing DR is laid on the tablet surface 13a and affixed thereto by adhesive tape or the like, after which the menu MN is similarly laid on and affixed to the tablet surface 13a, at a portion thereof, not covered by the drawing DR, as shown in FIG. 7(A). When the operator selects Item No. 5 (FIG. 6) under these conditions, the following prompt appears on the CRT screen:

UPPER RIGHT=☐,☐ thereby inquiring about the position of the upper right portion of the menu MN. The operator responds by positioning the cross-hair intersection $P_c$ of the position reader, provided on the cursor unit 13c (FIG. 3), at the upper right corner $P_{ru}$ of the menu MN, shown in FIG. 7(B), followed by depressing one of the switches SW1, SW2. This causes the X, Y coordinates $(X_1,Y_1)$ of the point $P_{ru}$ to be fed into the system. Next, the following prompt is displayed:

LOWER LEFT=☐,☐ calling for the entry of the point $P_{1d}$ at the lower left corner of the menu MN. As described above, the operator now places the cross-hair intersection $P_c$ of the cursor unit 13c at the point $P_{1d}$ and depresses one of the switches SW1, SW2 to enter the X, Y coordinates $(X_2,Y_2)$ of the point $P_{1d}$.

Distance x along the X axis and distance y along the Y-axis are expressed by the following, respectively:

$$x = X_1 - X_2, y = Y_1 - Y_2 \qquad (1)$$

Accordingly, the menu will be of the horizontal type if $x \geq y$ holds, and of the vertical type if $x < y$ holds. Thus the type of menu is decided by the magnitudes of x, y. If a horizontal menu is set in advance to have two rows and eight columns and a vertical menu is set in advance to have eight rows and two columns, by way of example, then, in the case of FIG. 7(B), $x > y$ will hold (horizontal menu), and the horizontal and vertical dimensions x', y', respectively, of each area will be:

$$x' = (X_1 - X_2)/8, \; y' = (Y_1 - Y_2)/2 \qquad (2)$$

thereby specifying the boundaries of the areas $a_1$ through $a_{16}$. This ends the processing for setting an information input zone.

Returning to Table II, Item No. 6 is for designating scale and scale reduction ratio for read coordinate values, and Item No. 7 is for entering an NC tape output code, allowing selection and entry of either as EIA code or ISO code.

(5) Coordinate Value Input Step

Figure 9:
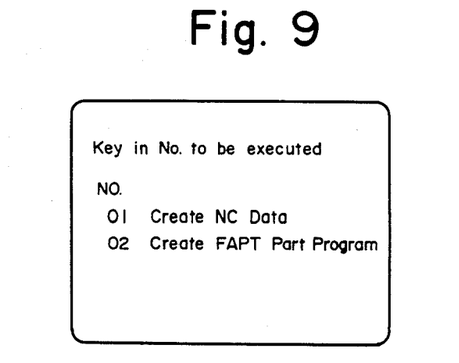
FIG. 9 is a plan view of another example of a display presented on the CRT of the graphic display device included in the system of FIG. 1.

When the condition setting processing for execution of the system program is completed by the foregoing operations, the system is ready to accept entry of various data for NC tape preparation. It should be noted that the display of FIG. 5 reappears on the CRT with the conclusion of processing in step (4) (i.e., by entering Item No. 8). The operator now touches key $R_o$ on keyboard 11a to initiate processing in accordance with the system program. More specifically, with a touch of key $R_o$, the CRT displays a prompt calling for either NC data (NC tape) creation or part program creation, as shown in FIG. 9. The operator enters "01" to execute processing for the creation of NC data, or "02" to execute processing for the creation of a part program. The following discussion will deal with selection of "01", namely NC data creation.

Next, the operator enters various data for NC data creation. Such data may consist of (a) mode data such as point mode, linear cutting mode, circular arc cutting mode and continuous mode, and (b) point data relating to points on a drawing. The mode data is entered by designating, through use of the cursor unit, a predetermined area on the information input zone established in step (4).

Figure 10:
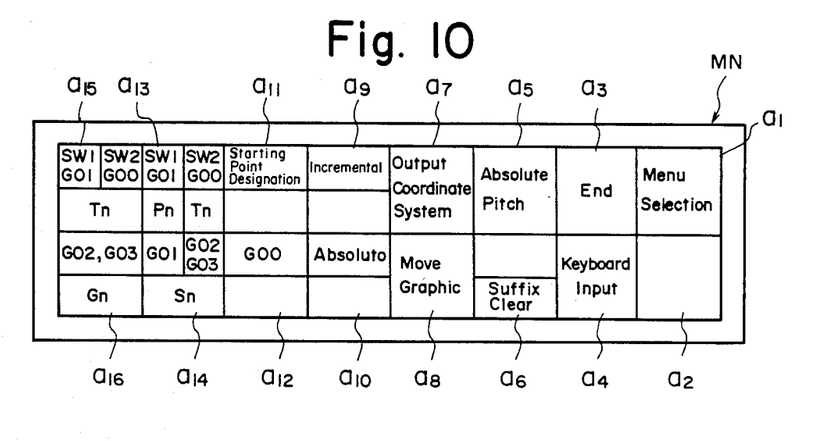
FIG. 10 is a schematic diagram of the details of a menu depicted in FIG. 8.

FIG. 10 illustrates the details of a horizontal-type menu MN used in setting an information input zone, in which each area is assigned boundary lines, as well as a particular meaning. The areas $a_{12}$, $a_{13}$, $a_{14}$, $a_{15}$, $a_{16}$ are mode selection areas. Area $a_1$ is a menu selection area which must always be designated before selecting a new move. The areas $a_{12}$, $a_{13}$ are areas for designating a point mode, the areas $a_{14}$, $a_{16}$ are for designating linear and circular arc cutting modes, and the area $a_{15}$ is for designating a continuous mode.

The point mode is a mode in which points are entered one at a time to create cutting-feed/rapid-traverse NC data. Selecting the point mode makes it possible to enter points from a drawing by using the tablet. In other words, assume that the operator selects area $a_{12}$ or $a_{13}$ to establish the point mode, places the cross-hair intersection $P_c$ of the cursor unit 13c on the prescribed position on the tablet surface, and presses the first switch SW1 or second switch SW2 (FIG. 3). This will create an item of NC data for rapid-traverse or cutting-feed movement from the previous position to the just indicated position. When the operator restores switch SW1 or switch SW2 to the original position, moves the cursor unit to another position on the design drawing and then again presses switch SW1 or switch SW2, this creates an item of rapid-traverse or cutting-feed NC data for movement to this other position. By repeating this operation, the operator may enter successively an item of cutting-feed/rapid-traverse data with respect to each separately entered position (i.e., the coordinate values of the position). Note that when area $a_{12}$ is selected, an item of rapid-traverse NC data is created regardless of which of the first and second switches SW1, SW2 is pressed. When area $a_{13}$ is selected, however, an item of cutting-feed NC data is created when switch SW1 is pressed, and an item of rapid-traverse NC data is created when switch SW2 is pressed.

Figure 11:
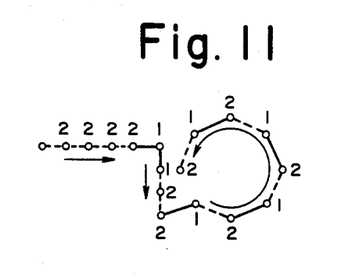
FIGS. 11 and 12 are schematic diagrams used for describing numerical control graphic data created in a point mode of operation.

FIG. 11 is an example of a graphic which is entered in the point mode by selecting area $a_{13}$ and designating a series of points on a drawing one after another using the cursor unit while selectively pressing switch SW1 or SW2 at each point. In FIG. 11, the dotted lines indicate the creation of NC data for rapid-traverse, while the solid lines indicate the creation of NC data for linear cutting. Each numerical value "1" indicates when the first switch SW1 was pressed, and each numerical value "2" indicates when the second switch SW2 was pressed.

Figure 12:
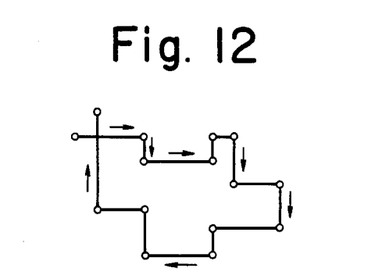

As opposed to the point mode, the cutting mode is one in which an item of linear cutting data or circular arc cutting data is created on the basis of each successively entered point (coordinate values). Selecting the cutting mode of operation makes it possible to enter points from a drawing by using the tablet 13a. The following will serve as examples:

(a) To create NC data for linear cutting: The operator selects area $a_{14}$, aligns the cross-hair intersection $P_c$ of the cursor unit 13c with a prescribed position on the tablet 13a and presses switch SW1. This causes the creation of an item of linear cutting data for movement from the immediately preceding position designated by the cursor unit 13c to the newly designated position. If the operator then moves the cursor unit 13c to another position on the tablet surface and presses switch SW1, then this will again produce an output of linear cutting data for movement to this other position. Repeating this operation will create NC data for cutting a workpiece by causing a tool to move along a contour of the kind shown in FIG. 12.

Figures 13, 14, 15:
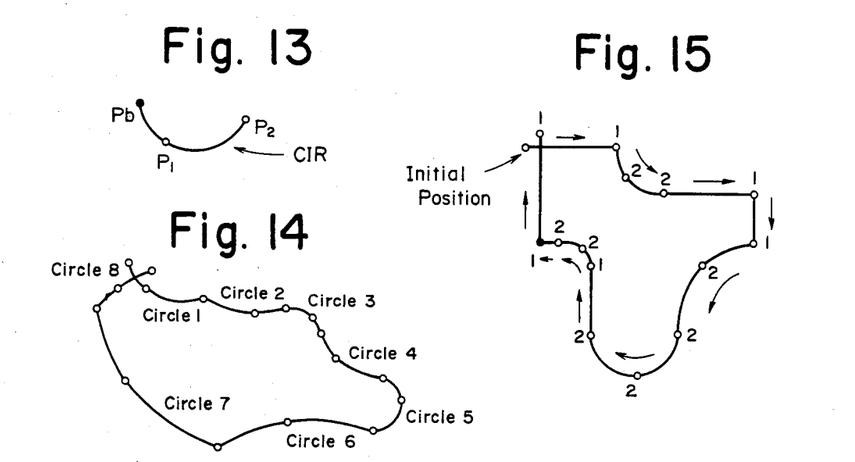
FIGS. 13, 14, and 15 are diagrams used for describing numerical control graphic data created in a cutting mode of operation.

(b) To create NC data for cutting circular arcs: The operator selects area $a_{16}$, aligns the cross-hair intersection $P_c$ of the cursor unit 13c with a prescribed position P1 (FIG. 13) on the tablet 13a, presses switch SW2, moves the cursor unit 13c to another position P2 on the tablet and again presses switch SW2. The entry of the above-mentioned two points forms a circular arc CIR from an immediately preceding point Pb and the two newly entered points P1, P2, thereby creating NC data for circular interpolation. By repeating the above operation, the operator creates successive items of NC data for interpolating circular arcs connected as shown in FIG. 14. The selected arcs each pass through three points. Whether an arc is a clockwise or counter-clockwise arc is determined automatically by the points entered. If area $a_{16}$ is selected, then circular arc cutting data will be created regardless of whether switch SW1 or SW2 is pressed.

(c) To create NC data for mixed linear and arc cutting by combining operations (a) and (b): FIG. 15 illustrates a shape based on NC data for mixed linear and arc cutting, created by selecting area $a_{14}$ and combining operations (a) and (b).

The continuous mode mentioned above is for the continuous creation of NC data for the linear cutting mode by moving the cursor unit along a graphic on a design drawing to continuously enter the coordinates of points lying on the graphic, and using the coordinates to create the desired NC data. More specifically, the operator selects area $a_{15}$, aligns the cross-hair intersection $P_c$ of the cursor unit with a predetermined position $P_s$ (FIG. 16) on a drawing placed on the tablet, and then presses the first switch SW1. This creates linear cutting data for movement from a previously prevailing position $P_B$ to the position $P_s$ just designated. Next, if the switch SW1 is kept depressed and the cursor unit is moved along the graphic FIG in FIG. 16, then NC data for linear cutting will be created using the coordinates which prevail each time the distance moved along either axis coincides with a so-called "sampling pitch", namely a minimum reading distance or increment of movement, described below. If the operator presses the second switch S2 on the cursor unit upon designating a predetermined position on the tablet, this will produce an output of rapid-traverse data indicative of movement from the previously prevailing point to the position designated.

Figure 17:
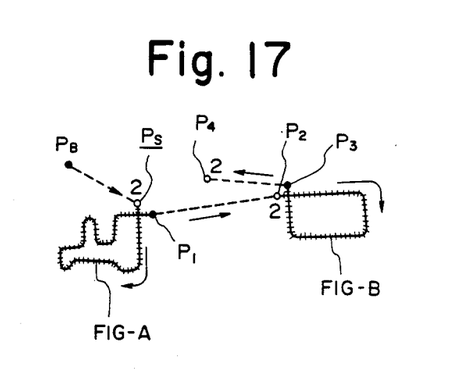

FIG. 17 is an example of graphics which may be entered in the continuous mode of operation. The operation proceeds by aligning the cursor unit with the point $P_s$, pressing switch SW2, then moving the cursor unit to point $P_1$ following the contour of the graphic FIG-A while switch SW1 is held depressed. Switch SW1 is released at point $P_1$, the cursor unit is aligned with point $P_2$, switch SW2 is pressed at point $P_2$, moving and the cursor unit is moved to point $P_3$ following the contour of the graphic FIG-B while keeping switch SW1 depressed. Finally, switch SW1 is realized at point $P_3$, the cursor unit is aligned with point $P_4$, and switch SW2 is pressed. These steps will enter the desired graphics.

Figure 18:
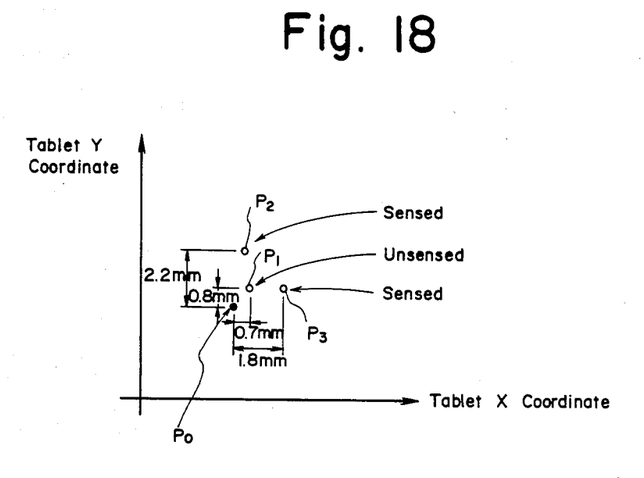
FIG. 18 is a diagram used for describing sampling pitch.

FIG. 18 is a diagram used for describing the setting of sampling pitch. After number 01 or number 02 is entered (FIG. 9) to designate the creation of either NC data or a part program, respectively, a state enabling a sampling pitch input will be established if the operator designates area a$_5$ (FIG. 10) using the cursor unit. The following prompt:

KEY IN SAMPLING PITCH will appear on the CRT screen. The operator may now set a sampling pitch by going to the keyboard and entering the unit (0.1 mm or more) to be used as the pitch. The term "sampling pitch" means the minimum interval set between coordinates entered by the tablet. When the length of an axial component (along either the X or Y axis) between a position currently designated by the cursor unit and a position entered immediately before the current position exceeds the set sampling pitch, the coordinates of the currently designated position are delivered as an output signal. FIG. 18 illustrates a case where 1.0 mm is entered as the sampling pitch. The point P$_0$ is a point entered first. In this case point P$_1$ will not be sensed for entry as an input because it lies within the minimum pitch relative to point P$_0$ along both the X and Y axes. The points P$_2$, P$_3$, however, are sensed and are fed into the system as inputs thereto because they exceed the minimum pitch relative to point P$_0$ along at least one axis.

Figure 19:
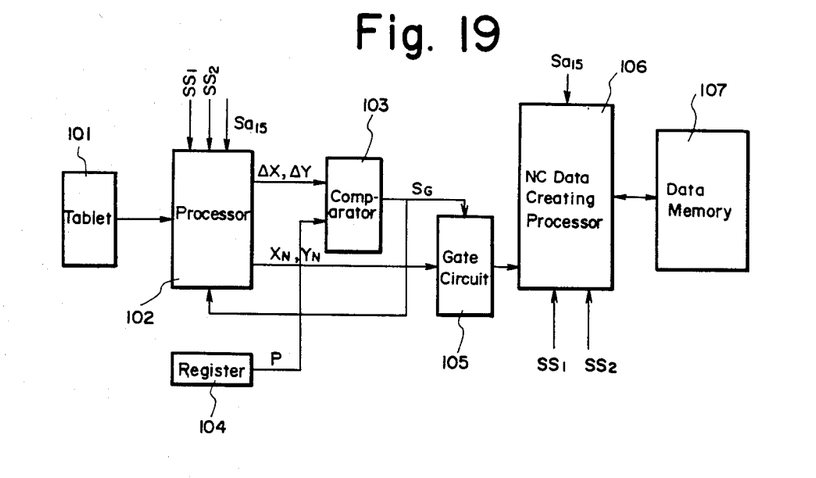
FIG. 19 is a block diagram of a circuit for creating numerical control data according to the present invention.

FIG. 19 is a block diagram of a circuit for practicing the creation of NC data in the continuous mode according to the present invention. The continuous mode is established, giving rise to a continuous mode signal Sa$_{15}$ (logical "1"), when the operator designates the area a$_{15}$ with the cursor unit following the designation of the menu selection area a$_1$ in the information input zone (FIG. 10). If the operator now takes the cursor unit, aligns it with a prescribed position (for example point P$_s$ in FIG. 16) on the tablet 101 and presses the first switch SW1 (FIG. 3), then a signal indicative of the coordinates (X$_N$,Y$_N$) of the prescribed position will be fed into a processor 102. Since the latter has a register (not shown) storing the old coordinates of a position entered immediately prior to P$_s$, the processor 102 performs the arithmetic operations:

$$\Delta X = X_N - X_0, \quad \Delta Y = Y_N - Y_0 \tag{3}$$

and delivers $\Delta X$, $\Delta Y$ to a comparator 103. The latter compares the magnitudes of $\Delta X$, $\Delta Y$ with the magnitude of a sampling pitch (minimum reading distance) P stored in a register 104, and produces a gate signal S$_G$ when either or both of $\Delta X > P$ or $\Delta Y > P$ hold. The gate signal SG is deliverd to the processor 102 and to a gate circuit 105, whereby the coordinates X$_N$, Y$_N$ received from the tablet 101 replace the old coordinates X$_0$, Y$_0$ in the register and are fed into an NC data creation processor 106 through the gate circuit 105. The latter processor 106 creates NC data in accordance with (a) the coordinates (X$_N$,Y$_N$) input thereto, (b) the prevailing mode, which in this case is the continuous mode established by the signal Sa$_{15}$ (logical "1"), and (c) the logic levels of switch signals SS1, SS2, indicating which of the first and second switches SW1, SW2 is depressed. Since the first switch SW1 will be depressed in this case, signal SS1 will be logical "1" so that the NC data created will be for linear cutting.

Figure 16:
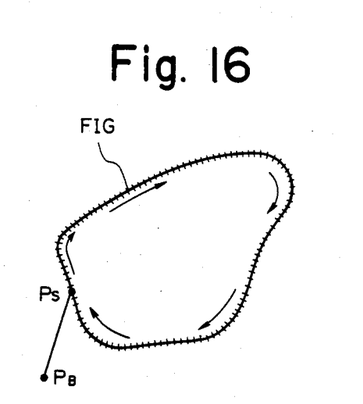
FIGS. 16 and 17 are diagrams used for describing NC graphics created in a continuous mode of operation.

Next, when the operator moves the cursor unit along the graphic FIG in FIG. 16, the processor 102 receives coordinate values XN, YN periodically from the tablet 101, these coordinates being points on the graphic FIG. Each time the coordinates are received, the processor 102 performs the operations given by expression (3) above and applies $\Delta X$, $\Delta Y$ to the comparator 103. When both $\Delta X$ and $\Delta Y$ are less than the sampling pitch, X$_N$, Y$_N$ are not applied to the NC data creation processor 106 due to the absence of the gate signal S$_G$. If $\Delta X > P$ or $\Delta Y > P$, however, then the comparator 103 generates the gate signal S$_G$, causing X$_N$, Y$_N$ to be fed into the processor 106 and to be stored in the internal register of processor 102 in place of the old coordinate values. The processor 106 proceeds to create NC data based on the coordinate values X$_N$, Y$_N$ input thereto, and to store the data in a data memory 107. The foregoing processing continues to successively create NC data constituting the program to be punched into a paper tape.

In accordance with the present invention as described and illustrated hereinabove, NC data can be created in a simple and rapid manner, without requiring special skills, merely by designating the mode data and the desired points on a design drawing placed on the tablet. In addition, coordinate values can be entered directly merely by designating desired points on a design drawing, even if dimensions and the like are not indicated on the drawing. Also, the coordinates of points on a graphic can be entered by designating the points at random, and the coordinates of a multiplicity of points can be entered continuously by moving a coordinate designating device along the contour of the graphic. Therefore, regardless of whether graphics are composed of curves other than straight lines and circular arcs, it is a simple matter to create NC data approximating straight line segments by virtue of the sampling pitch interval.

As many apparently widely different embodiments of the present invention can be made without departing from the spirit and scope thereof, it is to be understood that the invention is not limited to the specific embodiments thereof except as defined in the appended claims.

We claim:

1. An apparatus for creating numerical control data by entering coordinate values of points plotted on a drawing, comprising:

coordinate generating means including coordinate designating means for designating a position on the drawing and means for generating first and second coordinate values corresponding to the position of said coordinate designating means on the drawing, said coordinate designating means having selection switches capable of selecting an output of rapid-traverse data or linear cutting data when said coordinate designating means is moved to the present position from the immediately preceding position;

a first processor, coupled to said coordinate generating means, for receiving, an inputs thereto, the first and second coordinate values of a present position designated by said coordinate designating means and the first and second coordinate values of an immediately preceding position designated by said coordinate designating means, and for computing the change in the first and second coordinate values from the immediately preceding position to the present position;

a register for storing a minimum reading distance for each of the first and second coordinates;

a comparator, coupled to said first processor and said register, for receiving the computed values from said first processor and for comparing the magnitude of the computer values with the minimum reading distance stored in said register, said comparator producing a gate signal which is applied to said first processor when the computed values are larger than the minimum reading distance for each of the first and second coordinates;

a gate circuit, coupled to said comparator and said first processor, for providing, as an output, the first and second coordinate values of the present position when the gate signal is received from said comparator; and a second processor, coupled to said gate circuit and said selection switches, for creating numerical control data when the first and second coordinate values of the present position are provided by said gate circuit, and said selection switches on said coordinate designating means are in the mode for producing linear cutting data.

2. The apparatus according to claim 1, further comprising a data memory, coupled to said second processor, for storing the numerical control data created by said second processor.

* * * * *

UNITED STATES PATENT AND TRADEMARK OFFICE
CERTIFICATE OF CORRECTION

PATENT NO. : 4,627,003
DATED : DECEMBER 2, 1986
INVENTOR(S) : HAJIMU KISHI ET AL.

It is certified that error appears in the above-identified patent and that said Letters Patent is hereby corrected as shown below:

Col. 3, line 19, "featutes" should be --features--.

Col. 10, line 63, delete "moving".

Col. 11, line 46, equation 3, "$\Delta Y = YN - Y_O$" should be $$--\Delta Y = Y_N - Y_O--.$$

Col. 12, line 58, "an" should be --as--.

Signed and Sealed this

Twenty-first Day of April, 1987

*Attest:*

DONALD J. QUIGG

*Attesting Officer*  *Commissioner of Patents and Trademarks*